(12) United States Patent
Kim et al.

(10) Patent No.: US 9,614,450 B2
(45) Date of Patent: Apr. 4, 2017

(54) CONTROL VOLTAGE ADJUSTING CIRCUIT, FEEDBACK SIGNAL GENERATING CIRCUIT, AND CONTROL CIRCUIT INCLUDING THE SAME

(71) Applicant: SOLUM CO., LTD., Suwon-si (KR)

(72) Inventors: Ki Hong Kim, Suwon-Si (KR); Byoung Woo Ryu, Suwon-Si (KR); Jung Woo Choi, Suwon-Si (KR)

(73) Assignee: SOLUM CO., LTD., Suwon-si (KR)

( * ) Notice: Subject to any disclaimer, the term of this patent is extended or adjusted under 35 U.S.C. 154(b) by 125 days.

(21) Appl. No.: 14/617,906

(22) Filed: Feb. 9, 2015

(65) Prior Publication Data

US 2016/0056725 A1 Feb. 25, 2016

(30) Foreign Application Priority Data

Aug. 21, 2014 (KR) .................. 10-2014-0108878

(51) Int. Cl.
| | | |
|---|---|---|
| *H02M 3/335* | (2006.01) | |
| *H02M 3/337* | (2006.01) | |
| *H05B 33/08* | (2006.01) | |
| *H02M 1/00* | (2006.01) | |

(52) U.S. Cl.
CPC ..... *H02M 3/33538* (2013.01); *H02M 3/3376* (2013.01); *H05B 33/0815* (2013.01); *H02M 2001/0025* (2013.01); *H02M 2001/0058* (2013.01); *Y02B 70/1491* (2013.01)

(58) Field of Classification Search
CPC ......... H02M 2001/0025; H02M 3/335; H02M 3/33507; H02M 3/33523; G05F 1/648; G05F 1/652
See application file for complete search history.

(56) References Cited

U.S. PATENT DOCUMENTS

| | | | |
|---|---|---|---|
| 2012/0327687 A1* | 12/2012 | Chueh ............... | H02M 3/33507 363/13 |
| 2014/0126665 A1* | 5/2014 | Lee ...................... | H04B 1/1607 375/295 |
| 2014/0176096 A1* | 6/2014 | Yamamoto ............ | H02M 3/158 323/271 |
| 2014/0203791 A1* | 7/2014 | Lee ....................... | G05F 1/468 323/282 |

FOREIGN PATENT DOCUMENTS

| | | |
|---|---|---|
| KR | 10-2010-0134944 A | 12/2010 |
| KR | 10-2011-0066734 A | 6/2011 |
| KR | 10-2013-0074889 A | 7/2013 |

* cited by examiner

*Primary Examiner* — Harry Behm
(74) *Attorney, Agent, or Firm* — Sughrue Mion, PLLC

(57) ABSTRACT

A feedback signal generating circuit may include a control voltage adjusting circuit outputting a feedback voltage by comparing a control voltage input from an external voltage source with a reference voltage and adjusting a ratio of control voltage drop, and an amplifying circuit generating a feedback signal by differentially amplifying the feedback voltage and a detection voltage associated with a current flowing in a load.

8 Claims, 5 Drawing Sheets

CONTROL VOLTAGE ADJUSTING CIRCUIT, FEEDBACK SIGNAL GENERATING CIRCUIT, AND CONTROL CIRCUIT INCLUDING THE SAME

CROSS-REFERENCE TO RELATED APPLICATION

This application claims the priority and benefit of Korean Patent Application No. 10-2014-0108878, filed on Aug. 21, 2014, with the Korean Intellectual Property Office, the disclosure of which is incorporated in its entirety herein by reference.

BACKGROUND

Some embodiments of the present disclosure may relate to a control voltage adjusting circuit, a feedback signal generating circuit, and a control circuit including the same.

In existing liquid crystal display (LCD) devices, cold cathode fluorescent lamps (CCFLs) have mainly been used as backlight light sources. However, light emitting diodes (LEDs) have gradually been introduced as light sources in backlight units, due to various advantages, such as low power consumption, a relatively long lifespan, environmentally-friendly characteristics, and the like.

In order to drive the LEDs, a power supply circuit for converting alternating current (AC) power into direct current (DC) power and a driving circuit for controlling the supply of the DC power to the LEDs may be generally used.

The driving circuit for the LEDs may control the supply of the DC power so that an output current supplied to the LED is linearly varied in proportional to a dimming voltage input from an external voltage source. Recently, it has been necessary to uniformly maintain a level of the output current at a dimming voltage threshold level or less.

RELATED ART DOCUMENT (Patent Document 1) Korean Patent Laid-Open Publication No. 10-2010-0134944

SUMMARY

Some exemplary embodiments in the present disclosure may provide a control voltage adjusting circuit, a feedback signal generating circuit, and a control circuit which are able to uniformly maintain a current flowing in a light emitting diode (LED) channel at a control voltage lower than a reference voltage.

According to an exemplary embodiment in the present disclosure, a control voltage adjusting circuit may include: a comparing unit comparing a control voltage input from an external voltage source with a reference voltage; and a voltage dividing unit adjusting a ratio of control voltage drop depending on a comparison result of the comparing unit.

According to an exemplary embodiment in the present disclosure, a feedback signal generating circuit may include: a control voltage adjusting circuit outputting a feedback voltage by comparing a control voltage, input from an external voltage source, with a reference voltage and adjusting a ratio of control voltage drop; and an amplifying circuit generating a feedback signal by differentially amplifying the feedback voltage output from the control voltage adjusting circuit and a detection voltage associated with a current flowing in a load.

According to an exemplary embodiment in the present disclosure, a control circuit of a power converting circuit may supply an output voltage to a load connected to an output terminal on a secondary side, electrically insulated from a primary side, by switching an input voltage input to the primary side. The control circuit may include: a feedback signal generating circuit generating a feedback voltage by adjusting a ratio of control voltage drop depending on the control voltage input from an external voltage source and a reference voltage, and generating a feedback signal by differentially amplifying the feedback voltage and a detection voltage associated with a current flowing in the load; and a switching signal generating circuit controlling a switching operation of the input voltage depending on the feedback signal.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION

Exemplary embodiments of the present disclosure will now be described in detail with reference to the accompanying drawings.

Figure 1:
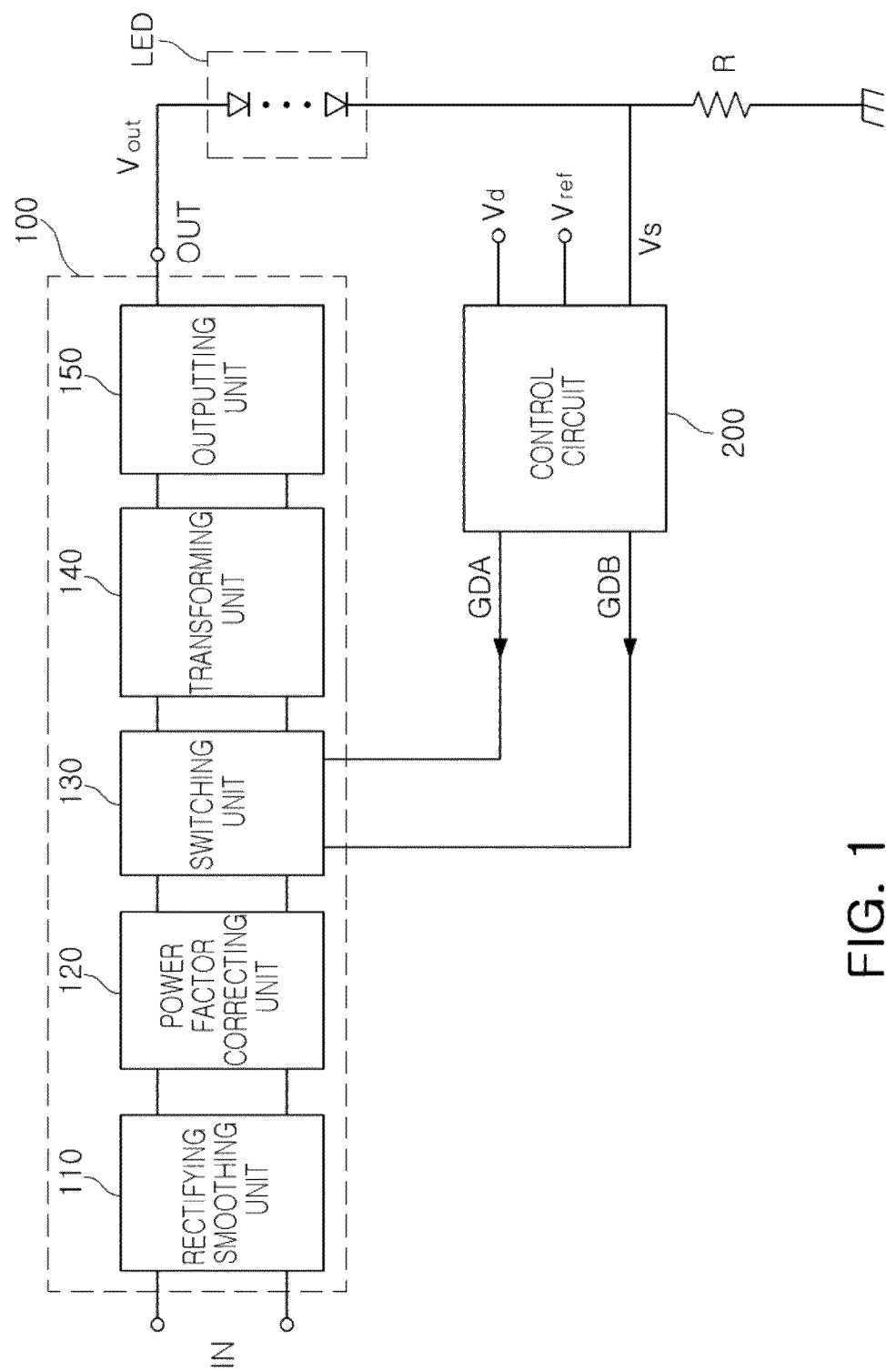
FIG. 1 is a diagram illustrating a power supply according to an exemplary embodiment in the present disclosure.

FIG. 1 is a diagram illustrating a power supply according to an exemplary embodiment in the present disclosure.

Referring to FIG. 1, a power supply 10 may include a power converting circuit 100 and a control circuit 200.

Figure 2:
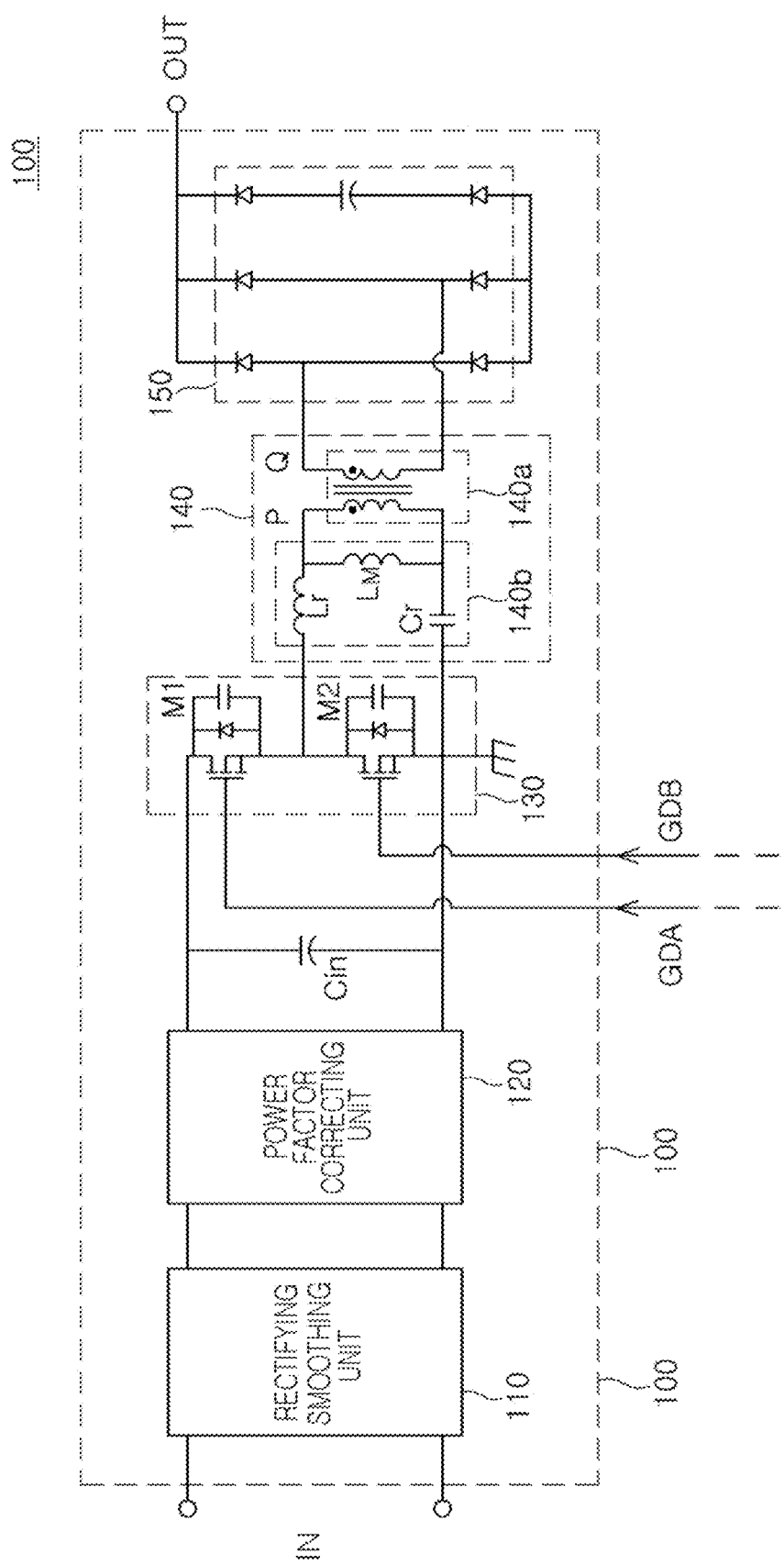
FIG. 2 is a diagram illustrating a power converting circuit according to an exemplary embodiment in the present disclosure.

FIG. 2 is a diagram illustrating a power converting circuit according to an exemplary embodiment in the present disclosure. The power converting circuit 100 according to the present exemplary embodiment will be described with reference to FIG. 2.

The power converting circuit 100 may include a switching unit 130, a transforming unit 140, and an outputting unit 150. The power converting circuit 100 may further include a rectifying smoothing unit 110 and a power factor correcting unit 120.

The rectifying smoothing unit 110 may rectify and smooth power input to an input terminal IN to generate direct current (DC) power and transfer the DC power to the power factor correcting unit 120. The power factor correcting unit 120 may correct a power factor, for example, but not limited to, by adjusting a phase difference between a voltage and a current of the power transferred from the rectifying smoothing unit 110.

The switching unit 130 may include at least two switches M1 and M2. The switches M1 and M2 may be stacked between a node to which the DC power from the power factor correcting unit 120 is input and a ground. The switching unit 130 may perform a power converting operation by an alternate switching operation of the switch M1 and the switch M2.

The transforming unit 140 may include a transformer 140a having a primary winding P and a secondary winding Q which have a preset turns ratio, and may vary a voltage level of power applied to the primary winding P of the transformer 140a to output the varied voltage level to the secondary winding Q. The primary winding P and the secondary winding Q may be electrically insulated from each other and may have different ground electrical properties.

The transforming unit 140 may further include a resonance tank 140b. The resonance tank 140b may provide an inductor-inductor-capacitor (Lr-Lm-Cr) (LLC) resonance operation. Here, one inductor (Lm) of the LLC may be, for instance, a magnetizing inductor of the transformer 140a.

The outputting unit 150 may rectify and stabilize the power from the secondary winding Q of the transformer 140a to output an output voltage Vout to an output terminal OUT. The output voltage Vout may be supplied to a load connected to the output terminal OUT, for example, but not limited to, at least one light emitting diode (LED) channel.

Referring to FIG. 1, the control circuit 200 may generate control signals GDA and GDB depending on the output voltage Vout and a voltage Vs associated with a current flowing in the LED channel. The control signals GDA and GDB may be provided to at least two switches M1 and M2 employed in the switching unit 130. The current flowing in the LED channel may be detected as a detection voltage Vs by a resistor R connected to an end of the LED channel.

Figure 3:
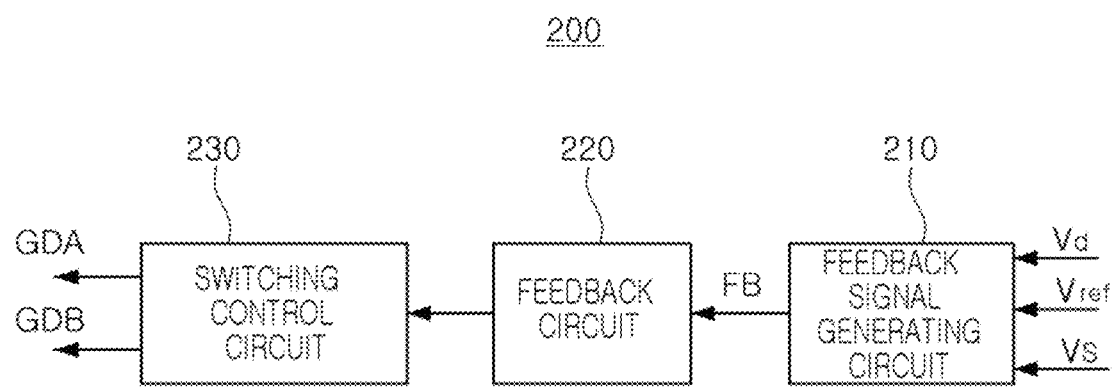
FIG. 3 is a diagram illustrating a control circuit according to an exemplary embodiment in the present disclosure.

FIG. 3 is a diagram illustrating a control circuit according to an exemplary embodiment in the present disclosure.

Referring to FIG. 3, the control circuit 200 may include a feedback signal generating circuit 210, a feedback circuit 220, and a switching control circuit 230.

The feedback signal generating circuit 210 may generate a feedback voltage Vf by varying a level of a control voltage Vd depending on a comparison result between the control voltage Vd and a reference voltage Vref, and may generate a feedback signal FB depending on levels of the feedback voltage Vf and the detection voltage Vs.

The control voltage Vd may refer to a voltage input from an external voltage source in order to control the output voltage of the power converting circuit 100. The power converting circuit 100 may increase the output voltage Vout in a case in which the level of the feedback voltage Vf generated from the control voltage Vd is high, and may decrease the output voltage Vout in a case in which the level of the feedback voltage Vf is low. That is, in the case in which the level of the feedback voltage Vf is changed, the level of the output voltage Vout may be linearly varied.

The feedback voltage Vf may be generated depending on the control voltage Vd and may be in proportional to the control voltage Vd, wherein a variation ratio may be changed on the basis of the reference voltage Vref. The variation ratios in a case in which the level of the control voltage Vd is varied below the level of the reference voltage Vref and in a case in which the level of the control voltage Vd is varied above the level of the reference voltage Vref may be different from each other.

The feedback circuit 220 may transfer the feedback signal FB provided from the feedback signal generating circuit 210 to the switching control circuit 230.

The switching control circuit 230 may generate the control signals GDA and GDB by setting at least one of a duty and a frequency thereof depending on the feedback signal FB transferred from the feedback circuit 220, and transfer the generated control signals GDA and GDB to the switches M1 and M2 of the switching unit 130, thereby controlling a power converting operation of the power converting circuit 100.

Hereinafter, the configuration of the control circuit 200 will be detailed with reference to FIGS. 4 through 6.

Figure 4:
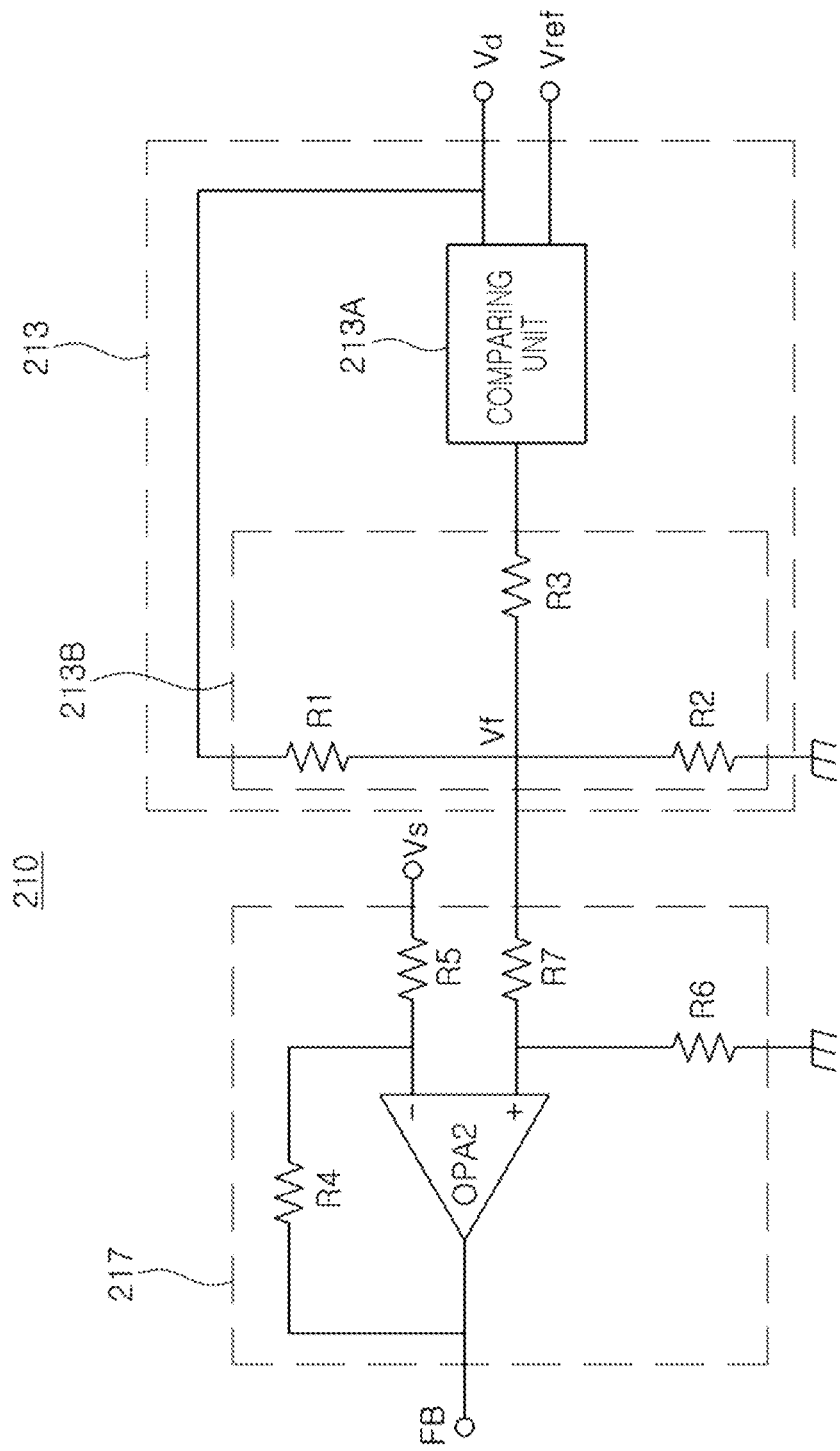
FIG. 4 is a diagram illustrating a feedback signal generating circuit according to an exemplary embodiment in the present disclosure.

FIG. 4 is a diagram illustrating the feedback signal generating circuit 210 according to an exemplary embodiment in the present disclosure. The feedback signal generating circuit 210 according to the present exemplary embodiment may include a control voltage adjusting circuit 213 and an amplifying circuit 217.

The control voltage adjusting circuit 213 may generate the feedback voltage Vf by comparing the control voltage Vd with the reference voltage Vref.

The control voltage adjusting circuit 213 may include a comparing unit 213A and a voltage dividing unit 213B. When the comparing unit 213A compares the control voltage Vd with the reference voltage Vref, in a case in which the control voltage Vd is higher than the reference voltage Vref, an output terminal of the comparing unit 213A may be floated, and in a case in which the control voltage Vd is lower than the reference voltage Vref, the output terminal of the comparing unit 213A may be short-circuited to the ground.

Figure 5:
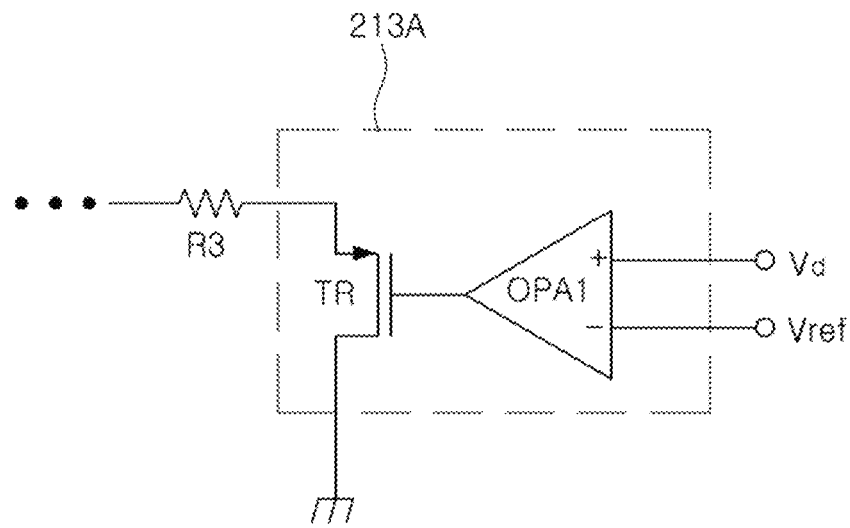
FIG. 5 is a diagram illustrating a comparing unit according to an exemplary embodiment in the present disclosure.

FIG. 5 is a diagram illustrating a comparing unit according to an exemplary embodiment in the present disclosure. Referring to FIG. 5, the comparing unit 213A may include a first operational amplifier OPA1 and a transistor TR. The first operational amplifier OPA1 may include a non-inverting terminal, to which the control voltage Vd is applied, and an inverting terminal, to which the reference voltage Vref is applied. An output terminal of the first operational amplifier OPA1 may be connected to a control terminal of the transistor TR. The transistor TR may include a p-type field-effect transistor (FET), wherein a source of the transistor may be connected to a third resistor R3; a drain thereof may be connected to a ground; and a gate thereof may be connected to the output terminal of the first operational amplifier OPA1.

In a case in which the control voltage Vd is higher than the reference voltage Vref, the first operational amplifier OPA1 may output a high level signal and the transistor TR may be turned-off. On the contrary, in a case in which the control voltage Vd is lower than the reference voltage Vref, the first operational amplifier OPA1 may output a low level signal and the transistor TR may be turned-on.

Referring to FIG. 4, the voltage dividing unit 213B may include at least three resistors R1 to R3. Here, the first resistor R1 and the second resistor R2 may be connected in series between the node, to which the control voltage Vd is applied, and the ground. The third resistor R3 may be connected between a connection node between the first resistor R1 and the second resistor R2 and the output terminal of the comparing unit 213A.

Since the output terminal of the comparing unit 213A is floated in the case in which the control voltage Vd is higher than the reference voltage Vref, the feedback voltage Vf generated at the connection node between the first resistor R1 and the second resistor R2 may be equal to a voltage obtained by dividing the control voltage Vd depending on a resistance ratio of a resistance value of the first resistor R1 to a resistance value of the second resistor R2.

In addition, since the output terminal of the comparing unit 213A is short-circuited to the ground in the case in which the control voltage Vd is lower than the reference voltage Vref, the feedback voltage Vf generated at the connection node between the first resistor R1 and the second resistor R2 may be equal to a voltage obtained by dividing the control voltage Vd depending on the resistance ratio of the resistance value of the first resistor R1 to a parallel resistance value of the second resistor R2 and the third resistor R3. In a case in which the resistance value of the third resistor R3 is extremely low and insignificant as compared to the resistance value of the second resistor R2, the third resistor R3 may be considered when the second resistor R2 and the third resistor R3 are connected in parallel.

That is, according to the present exemplary embodiment, the feedback voltage Vf may be generated by differently setting the variation ratio of the control voltage Vd, depending on the comparison between the control voltage Vd with the reference voltage Vref. A drop ratio of the control voltage Vd may be increased in the case in which the control voltage Vd is lower than the reference voltage Vref than the case in which the control voltage Vd is higher than the reference voltage Vref.

As described above, the power converting circuit 100 may generate the output voltage Vout depending on the level of the feedback voltage Vf. Since the level of the feedback voltage Vf is further decreased according to a higher drop ratio in the case in which the level of the control voltage Vd is lower than the level of the reference voltage Vref, the output voltage Vout may have a small fluctuation range.

The amplifying circuit 217 may include a second operational amplifier OPA2 and at least four resistors R4, R5, R6, and R7. The second operational amplifier OPA2 may differentially amplify the detection voltage Vs and the feedback voltage Vf depending on a resistance ratio of fourth to seventh resistors R4 to R7, and output the feedback signal FB through an output terminal of the second operational amplifier OPA2.

Here, the fourth resistor R4 may be connected between an inverting terminal and the output terminal of the second operational amplifier OPA2, and the fifth resistor R5 may have one terminal connected to the inverting terminal of the second operational amplifier OPA2 and the other terminal to which the detection voltage Vs is applied. In addition, the sixth resistor R6 may be connected between a non-inverting terminal of the second operational amplifier OPA2 and the ground, and the seventh resistor R7 may be connected between the non-inverting terminal of the second operational amplifier OPA2 and the connection node between the first resistor R1 and the second resistor R2. That is, the feedback signal FB may be negative-feedback to the second operational amplifier OPA2, and the second operational amplifier OPA2 may generate the feedback signal FB allowing the level of the detection voltage Vs to follow the feedback voltage Vf.

Figure 6:
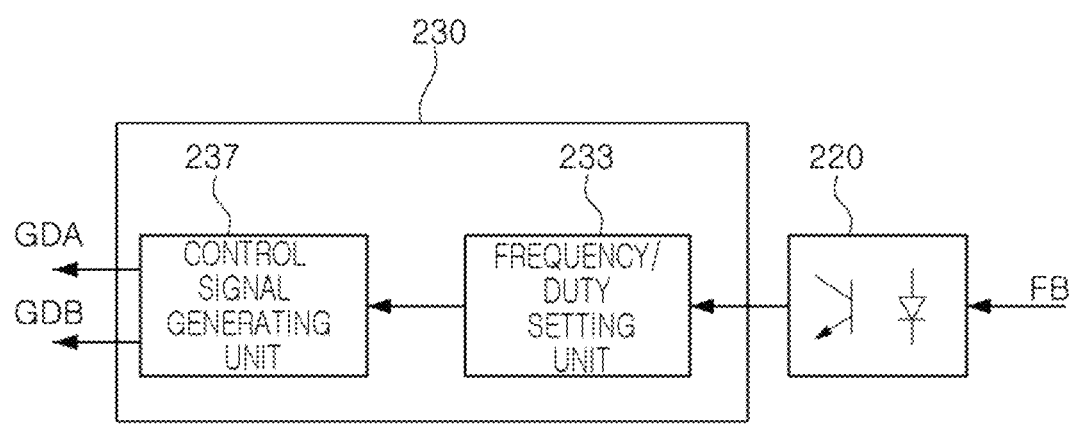
FIG. 6 is a diagram illustrating a feedback signal generating circuit according to an exemplary embodiment in the present disclosure.

FIG. 6 is a diagram illustrating a feedback signal generating circuit according to an exemplary embodiment in the present disclosure.

The feedback circuit 220 may include a photo-coupler to which the feedback signal FB from the feedback signal generating circuit 210 may be transferred. The feedback circuit 220 may transfer the feedback signal FB provided from the feedback signal generating circuit 210 to the switching control circuit 230.

The switching control circuit 230 may include a frequency/duty setting unit 233 and a control signal generating unit 237. The frequency/duty setting unit 233 may set at least one of a frequency and a duty depending on the feedback signal FB.

The control signal generating unit 237 may generate the control signals GDA and GDB depending on the frequency or the duty which is set by the frequency/duty setting unit 233. In a case in which a frequency level of the control signals GDA and GDB is high, the level of the output voltage Vout may be decreased. However, in a case in which the frequency level of the control signals GDA and GDB is low, the level of the output voltage Vout may be increased. In addition, in a case in which a duty level of the control signals GDA and GDB is high, the level of the output voltage Vout may be decreased. However, in a case in which the duty level of the control signals GDA and GDB is low, the level of the output voltage Vout may be increased.

As set forth above, according to some exemplary embodiments in the present disclosure, the current flowing in the LED channel at the control voltage Vd lower than the reference voltage Vref may be uniformly maintained.

While exemplary embodiments have been shown and described above, it will be apparent to those skilled in the art that modifications and variations could be made without departing from the scope of the invention as defined by the appended claims.

What is claimed is:

1. A feedback signal generating circuit, comprising:
   a control voltage adjusting circuit outputting a feedback voltage by comparing a control voltage input from an extremal voltage source with a reference voltage and adjusting a ratio of control voltage drop; and
   an amplifying circuit generating a feedback signal by differentially amplifying the feedback voltage and a detection voltage associated with a current flowing in a load,
   wherein the control voltage adjusting circuit includes:
      a comparing unit comparing the control voltage with the reference voltage; and
      a voltage dividing unit generating the feedback voltage by adjusting the ratio of the control voltage drop depending on a comparison result of the comparing unit,
   wherein the voltage dividing unit includes:
      a first resistor and a second resistor connected in series between a node to which the control voltage is input and a ground; and
      a third resistor having one end connected to a connection node between the first resistor and the second resistor and another end connected to an output terminal of the comparing unit, and
   wherein the feedback voltage is generated at the connection node between the first resistor and the second resistor.

2. The feedback signal generating circuit of claim 1, wherein the comparing unit floats the other end of the third resistor or short-circuits the other end of the third resistor to the ground, depending on the comparison result.

3. The feedback signal generating circuit of claim 1, wherein the comparing unit floats the other end of the third resistor when the control voltage is higher than the reference voltage, and short-circuits the other end of the third resistor to the ground when the control voltage is lower than the reference voltage.

4. The feedback signal generating circuit of claim 1, wherein the comparing unit includes:
a first operational amplifier having a non-inverting terminal to which the control voltage is applied and an inverting terminal to which the reference voltage is applied; and a transistor connected between the other end of the third resistor and the ground to perform a switching operation in response to an output signal of the first operational amplifier.

5. The feedback signal generating circuit of claim 4, wherein the transistor includes a p-type field effect transistor including a source connected to the other end of the third resistor, a drain connected to the ground, and a gate connected to an output terminal of the first operational amplifier.

6. The feedback signal generating circuit of claim 1, wherein the amplifying circuit includes: an inverting terminal to which the detection voltage is applied;
a non-inverting terminal to which the feedback voltage is applied; and an output terminal from which the feedback signal is output, the feedback signal being negative-feedback to the inverting terminal.

7. A control circuit of a power converting circuit supplying an output voltage to a load connected to a secondary side, electrically insulated from a primary side, by switching an input voltage input to the primary side, the control circuit comprising:
a feedback signal generating circuit generating a feedback voltage by adjusting a ratio of control voltage drop depending on a control voltage input from an extremal voltage source and a reference voltage, and generating a feedback signal by differentially amplifying the feedback voltage and a detection voltage associated with a current flowing in the load; and
a switching signal generating circuit controlling a switching operation of the input voltage depending on the feedback signal,
wherein the feedback signal generating circuit includes:
a comparing unit comparing the control voltage with the reference voltage; and
a voltage dividing unit generating the feedback voltage by adjusting the ratio of the control voltage drop depending on a comparison result of the comparing unit,
wherein the voltage dividing unit includes:
a first resistor and a second resistor connected in series between a node to which the control voltage is input and a ground; and
a third resistor having one end connected to a connection node between the first resistor and the second resistor and another end connected to an output terminal of the comparing unit, and
wherein the feedback voltage is generated at the connection node between the first resistor and the second resistor.

8. The control circuit of claim 7, further comprising a feedback circuit transferring the feedback signal to the switching signal generating circuit.

* * * * *